(12) United States Patent
Takada et al.

(10) Patent No.: US 10,763,485 B2
(45) Date of Patent: Sep. 1, 2020

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); ENVISION AESC JAPAN LTD., Kanagawa (JP)

(72) Inventors: Kotaro Takada, Mie (JP); Osamu Nakayama, Mie (JP); Mitsutoshi Morita, Mie (JP); Yasuo Yamazaki, Kanagawa (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); ENVISION AESC JAPAN LTD., Kanagawa (JP)

( * ) Notice: Subject to any disclaimer, the term of this patent is extended or adjusted under 35 U.S.C. 154(b) by 157 days.

(21) Appl. No.: 16/095,983

(22) PCT Filed: Apr. 11, 2017

(86) PCT No.: PCT/JP2017/014781
§ 371 (c)(1),
(2) Date: Oct. 24, 2018

(87) PCT Pub. No.: WO2017/187959
PCT Pub. Date: Nov. 2, 2017

(65) Prior Publication Data
US 2019/0140247 A1    May 9, 2019

(30) Foreign Application Priority Data
Apr. 27, 2016  (JP) ................. 2016-088902

(51) Int. Cl.
*H01M 2/20* (2006.01)
*H01M 2/34* (2006.01)
(Continued)

(52) U.S. Cl.
CPC ............. *H01M 2/206* (2013.01); *H01M 2/10* (2013.01); *H01M 2/1077* (2013.01);
(Continued)

(58) Field of Classification Search
None
See application file for complete search history.

(56) References Cited

U.S. PATENT DOCUMENTS

| 2013/0309553 A1* | 11/2013 | Kinoshita | H01M 2/34 429/158 |
| 2014/0154551 A1 | 6/2014 | Nakayama | |
| 2015/0125727 A1 | 5/2015 | Lui et al. | |

FOREIGN PATENT DOCUMENTS

| JP | 2013-033634 A | 2/2013 |
| JP | 2013-054995 A | 3/2013 |

(Continued)

OTHER PUBLICATIONS

Official Communication issued in World Intellectual Property Organization Patent Application No. PCT/JP2017/014781, dated May 30, 2017, along with an English translation thereof.

*Primary Examiner* — Wyatt P McConnell
(74) *Attorney, Agent, or Firm* — Greenblum & Bernstein P.L.C.

(57) ABSTRACT

A connection module includes an insulation protector including a bus bar holder holding a bus bar. The insulation protector includes connection units. The connection units include two end connection units at two ends of the insulation protector, and intermediate connection units that are between the two end connection units. The two end con-
(Continued)

nection units are connection units having a same structure, and one of the end connection units is relatively rotated by 180 degrees in a plan view with respect to another one of the end connection units, and each of the end connection units is connected to a corresponding intermediate connection unit.

5 Claims, 6 Drawing Sheets

(51) Int. Cl.
  *H01M 2/10* (2006.01)
  *H01M 10/48* (2006.01)
(52) U.S. Cl.
  CPC .......... *H01M 2/1094* (2013.01); *H01M 2/20* (2013.01); *H01M 2/34* (2013.01); *H01M 10/48* (2013.01); *H01M 10/482* (2013.01); *H01M 2220/20* (2013.01)

(56) References Cited

FOREIGN PATENT DOCUMENTS

| | | |
|---|---|---|
| JP | 2014-022256 A | 2/2014 |
| JP | 2017-027926 A | 2/2017 |
| WO | 2012/102373 A | 8/2012 |
| WO | 2013/021964 A | 2/2013 |

* cited by examiner

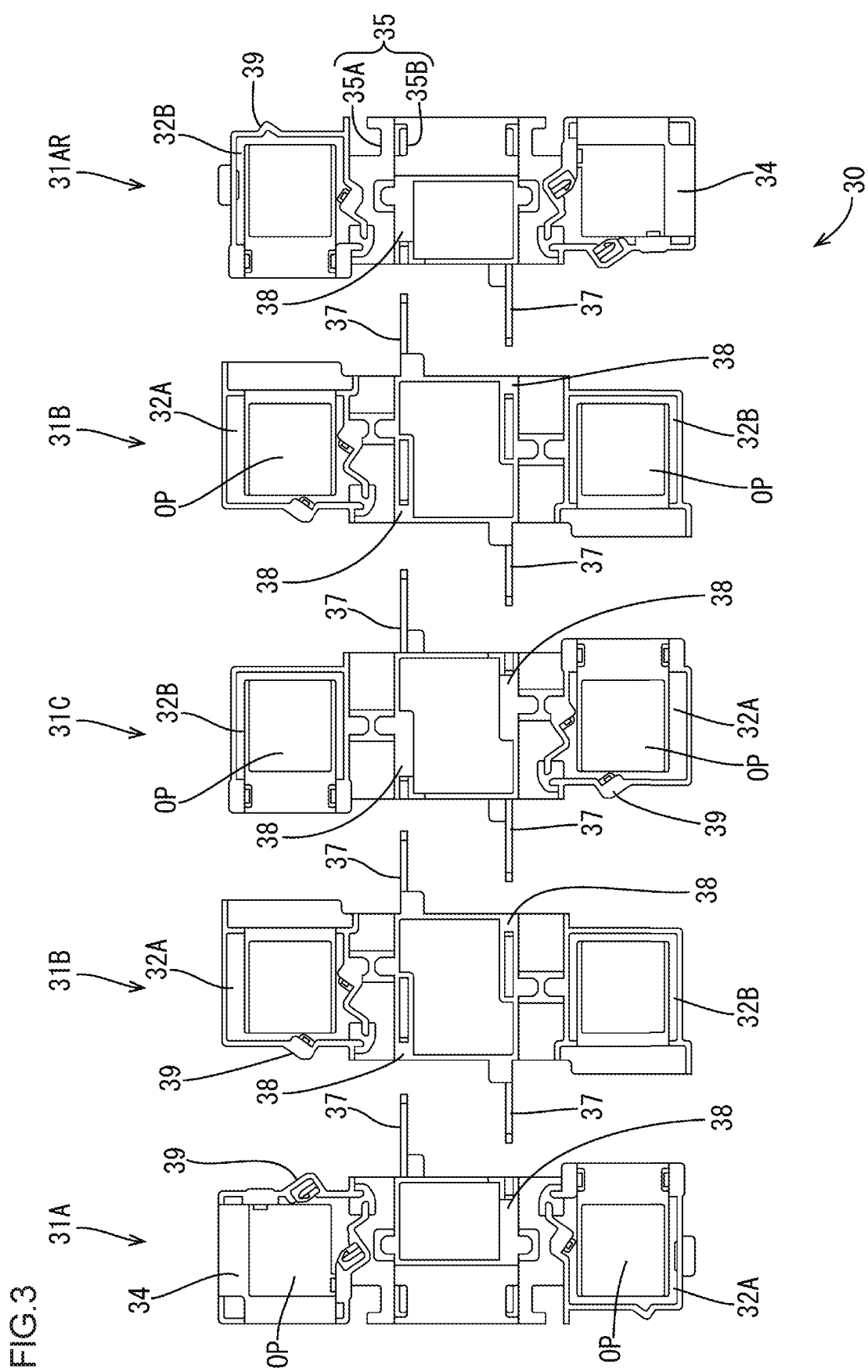

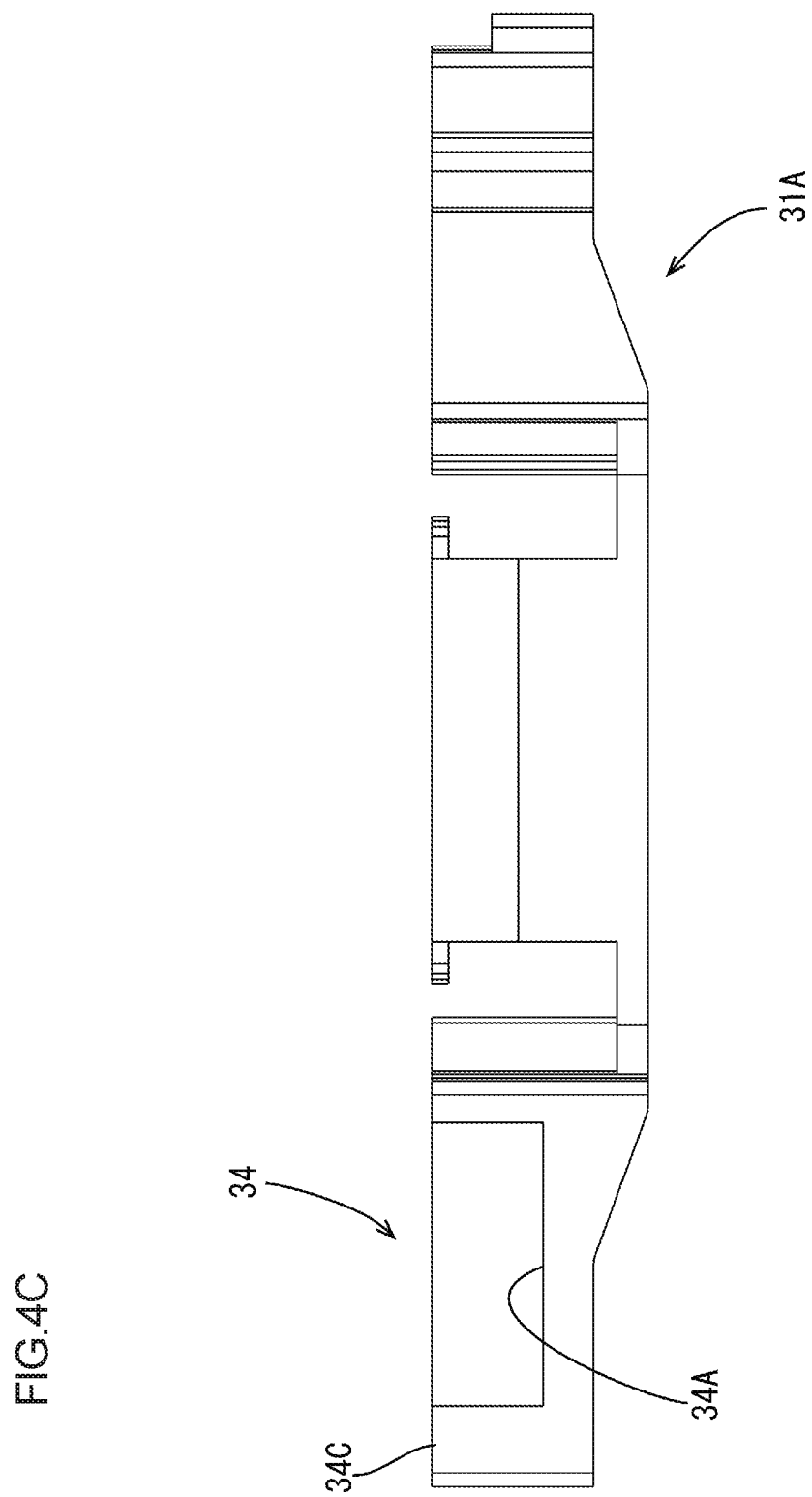

CONNECTION MODULE

TECHNICAL FIELD

The present technology relates to a connection module that is to be mounted in a power storage element group including multiple power storage elements, specifically, to a configuration of an insulation protector mounted on the connection module.

BACKGROUND ART

A known connection module that is to be mounted on the power storage element group is provided with an insulation protector that holds a bus bar connecting the electrode terminals of adjacent power storage elements. The insulation protector described in Patent Document 1 has been known as such an insulation protector. Patent Document 1 discloses a technology of providing an insulation protector by connecting multiple connection units corresponding to the multiple power storage elements.

PRIOR ART DOCUMENT

Patent Document

[Patent Document 1] Japanese Unexamined Patent Application Publication No. 2013-54995

However, in a configuration providing the insulation protector by connecting the connection units like a prior art, different types of connection units are required to be formed since the connection units at both ends are generally provided with power source terminals for obtaining power from the power storage element group. As the number of the types of the connection units increases, a manufacturing cost of the connection unit is increased.

The present technology described in this specification has been completed in view of the circumstances described above. There is provided a connection module in which the number of types of the connection units can be reduced in a configuration that the insulation protector including multiple connection units.

SUMMARY

A connection module described in this specification is to be mounted on a power storage element group including power storage elements having positive and negative electrode terminals, and the connection module includes a bus bar connecting the electrode terminals of adjacent power storage elements, and an insulation protector including a bus bar holder holding the bus bar and including connection units that are connected to each other in an arrangement direction in which the power storage elements are arranged. The connection units may include two end connection units at two ends of the insulation protector, and an intermediate connection unit being between the two end connection units, the two end connection units may be connection units having a same structure, and one of the end connection units may be relatively rotated by 180 degrees in a plan view with respect to another one of the end connection units, and each of the end connection units may be connected to a corresponding intermediate connection unit.

According to this configuration, each of the two end connection units is a connection unit having the same structure. One end connection unit and another end connection unit are connected to the corresponding intermediate connection unit while one end connection unit being relatively rotated by about 180 degrees with respect to another end connection unit. Namely, the end connection units are connection units of a same type. Accordingly, the number of types of the connection units can be reduced in a configuration that the insulation protector is configured by connecting the multiple connection units.

According to the connection module described in this specification, the number of types of the connection units can be reduced in a configuration of the insulation protector configured by connecting the connection units.

BRIEF DESCRIPTION OF THE DRAWINGS

FIG. 3 is an exploded plan view illustrating each connection unit of an insulation protector.

FIG. 4C is a schematic front view of the end connection unit.

MODE FOR CARRYING OUT THE INVENTION

A connection module 20 according to one embodiment will be described with reference to FIGS. 1 to 4. The connection module 20 is mounted on a vehicle such as an electric vehicle or a hybrid vehicle and is a part of a power storage module 1 (see FIG. 2) that is used as a power source for driving the vehicle.

Figure 2:
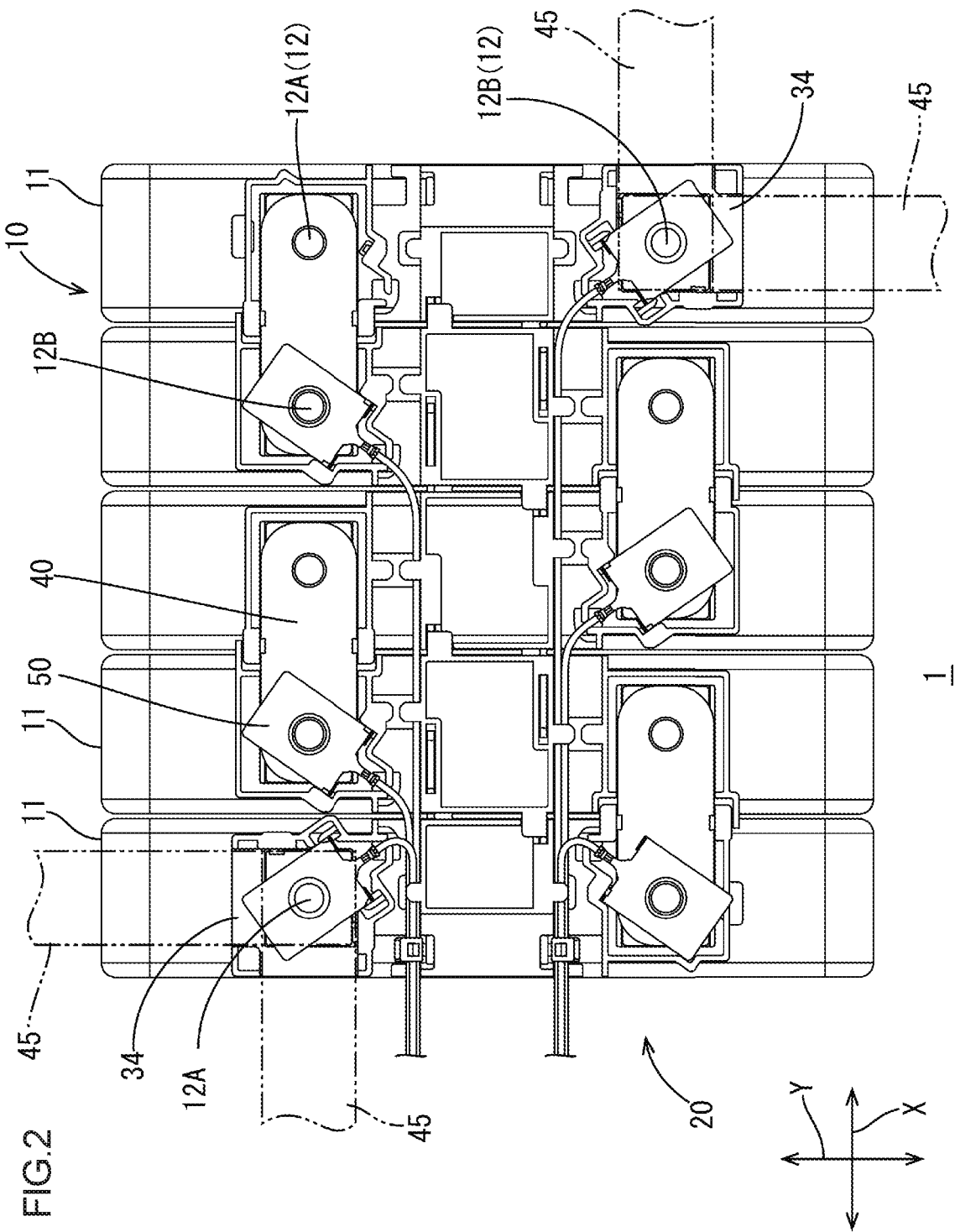
FIG. 2 is a schematic plan view illustrating a power storage module including the connection module.

The connection module 20 is mounted on a power storage element group 10 including multiple power storage elements 11 (five power storage elements 11 in this embodiment) and electrically connects adjacent power storage elements (see FIG. 2). In the following description, a symbol is put on one of the same parts and others may not be provided with the symbol and will not be described. The number of power storage elements 11 included in the power storage element group 10 is not necessarily five.

1. Power Storage Element

The power storage element 11 is a secondary battery, for example. As illustrated in FIG. 2, the power storage element 11 has a flat rectangular parallelepiped shape and includes a pair of electorde terminals 12 including a positive electrode terminal 12A and a negative electrode terminal 12B on an upper surface thereof. The electrode terminals 12 are arranged in a line along a long-side direction of the power storage element 11 (an arrow Y direction in FIG. 2). The electrode terminal 12 is formed in a hole shape having a thread part that is to be screwed with the thread of a bolt (not illustrated) such that the electrode terminal 12 is connected to a bus bar 40, which will be described later. The power storage elements 11 are arranged such that adjacent electrode terminals 12 have different polarities go to provide the power storage element group 10 and the power storage elements 11 are fixed each other via a holding plate (not illustrated). A configuration of the electrode terminal 12 is not necessarily a hole shape.

2. Connection Module

Figure 1:
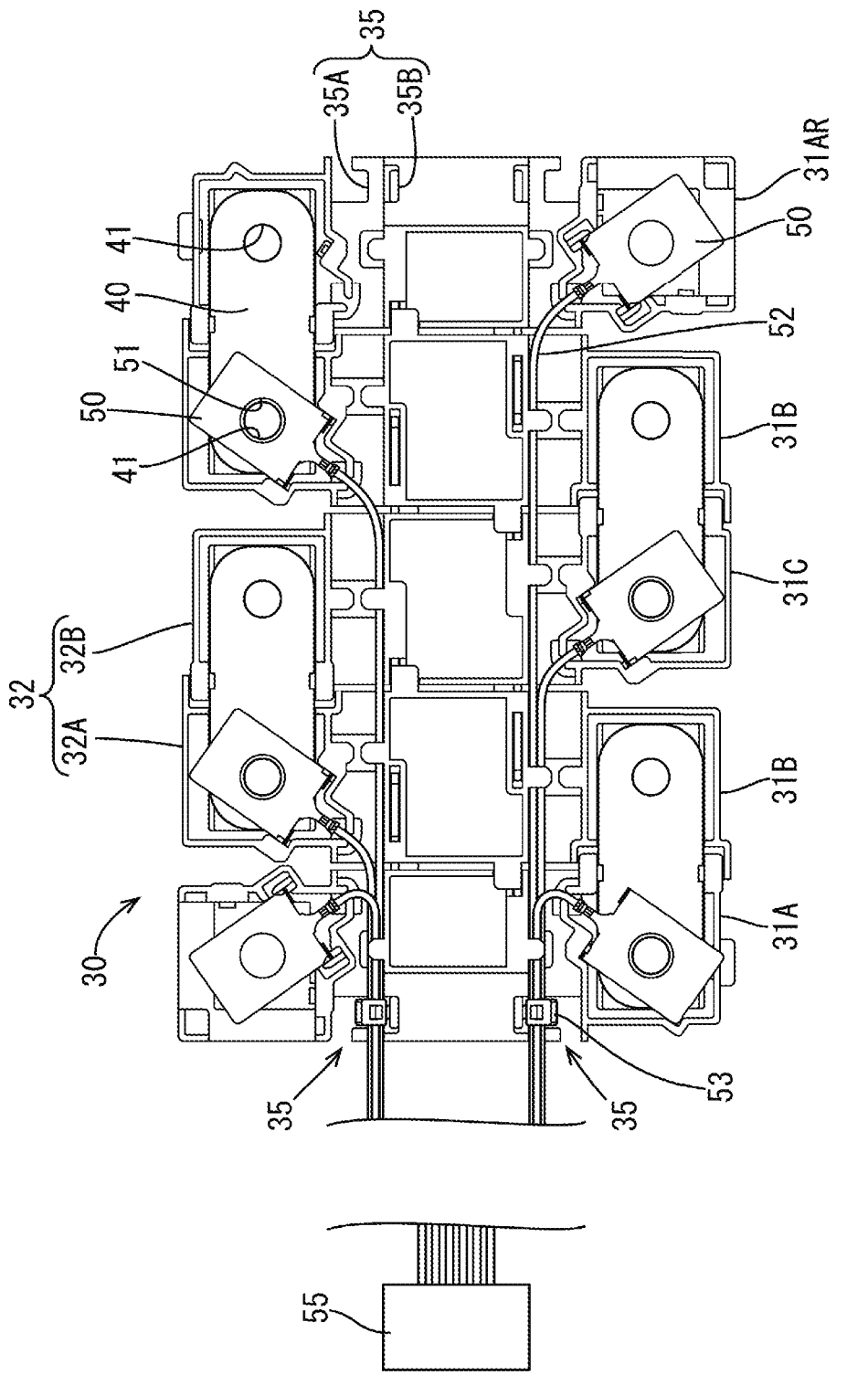
FIG. 1 is a schematic plan view illustrating a connection module according to one embodiment.

As illustrated in FIG. 1, the connection module 20 includes the bus bars 40, an insulation protector 30, voltage detection terminals 50 (an example of a conductive member), and detection wires 52. The bus bars are made of metal and connected to the positive and negative electrode terminals (12A, 12B) of the adjacent power storage elements 11. The insulation protector 30 includes a bus bar holder 32 that holds the bus bar 40. The voltage detection terminal 50 is electrically connected to the power storage element 11. The detection wire 52 is connected to the voltage detection terminal 50 and detects a state of the power storage element 11.

The bus bar 40 is formed by pressing a metal plate of copper, copper alloy, stainless steel (SUS), or aluminum into a predetermined shape and has a substantially rectangular shape as a whole, as illustrated in FIG. 1. A surface of the bus bar 40 may be processed with plating with metal such as tin or nickel. The bus bar 40 has a pair of terminal insertion through holes 41, 41 that are through the bus bar 40 and have substantially a circular shape. Bolts for connecting the bus bar 40 and the electrode terminals 12 are inserted through the terminal through holes 41. The terminal through hole 41 is slightly larger than a hole diameter of the electrode terminal 12. The bolt is inserted through the terminal through hole 41 and the thread of the bolt is screwed into the hole of the electrode terminal 12 and the bus bar 40 is present between a head of the bolt and a terminal base. Accordingly, the electrode terminal 12 and the bus bar 40 are electrically connected to each other.

2-1. Insulation Protector

As illustrated in FIG. 3, the insulation protector 30 includes multiple (five in this embodiment) connection units 31 that are arranged in an arrangement direction of the power storage elements 11 (a short-side direction of the power storage element 11, an X arrow direction in FIG. 2) and connected to each other.

The connection units 31 include two end connection units (31A, 31AR) disposed at two ends of the insulation protector 30 and intermediate connection units (31B, 31C) disposed between the two end connection units (31A, 31AR). Hereinafter, the connection units are referred to as the connection units 31 if it is not necessary to specify each of them.

The two end connection units (31A, 31AR) have a same structure and are connected to the respective corresponding intermediate connection units 31B while the two end connection units (31A, 31AR) being arranged such that one end connection unit 31A is relatively rotated by about 180 degrees with respect to another end connection unit 31AR in a plan view. Namely, as illustrated in FIG. 3, the end connection unit 31A and the end connection unit 31AR are a same type of connection unit and the end connection unit 31AR is inverted with respect to the end connection unit 31A and connected to the intermediate connection unit 31B.

As illustrated in FIG. 2, the end connection units (31A, 31AR) and the intermediate connection units (31B, 31C) are provided for the respective power storage elements 11. Namely, one connection unit 31 is provided for one power storage element 11. As illustrated in FIG. 3, the intermediate connection units (31B, 31C) include first intermediate connection units 31B that are connectable to the end connection units (31A, 31AR) and a second intermediate connection unit 31C that is connectable to the first intermediate connection units 31B.

In this embodiment, the insulation protector 30 includes five connection units 31 corresponding to the five power storage elements 11, and as illustrated in FIG. 3, the end connection unit 31A, the first intermediate connection unit 31B, the second intermediate connection unit 31C, the first intermediate connection unit 31B, and the end connection unit 31AR are connected to each other in this sequence from the left side. The end connection unit 31AR is inverted or rotated by 180 degrees in a plan view with respect to the end connection unit 31A. In this embodiment, the insulation protector 30 includes five connection units 31 including three types of connection units (31A, 31B, 31C).

Each of the connection units 31 has a rectangular plan view shape and includes the bus bar holder 32, a fitting projection 37, a fitting recess 38, a terminal stopper 39, and an opening hole OP. Specifically, the bus bar holder 32 holding one bus bar 40 includes a first bus bar holder 32A included in one connection unit 31 and a second bus bar holder 32B included in another connection unit 31 that is to be connected. The first bus bar holder 32A and the second bus bar holder 32B are mated and one bus bar holder 32 is provided.

The fitting projection 37 of one connection unit 31 is fit in the fitting recess 38 of another connection unit 31 such that the two connection units 31 are connected.

The opening hole OP is provided for connecting the electrode terminal 12 of the power storage element 11 to the bus bar 40 with a bolt.

Figure 4A:
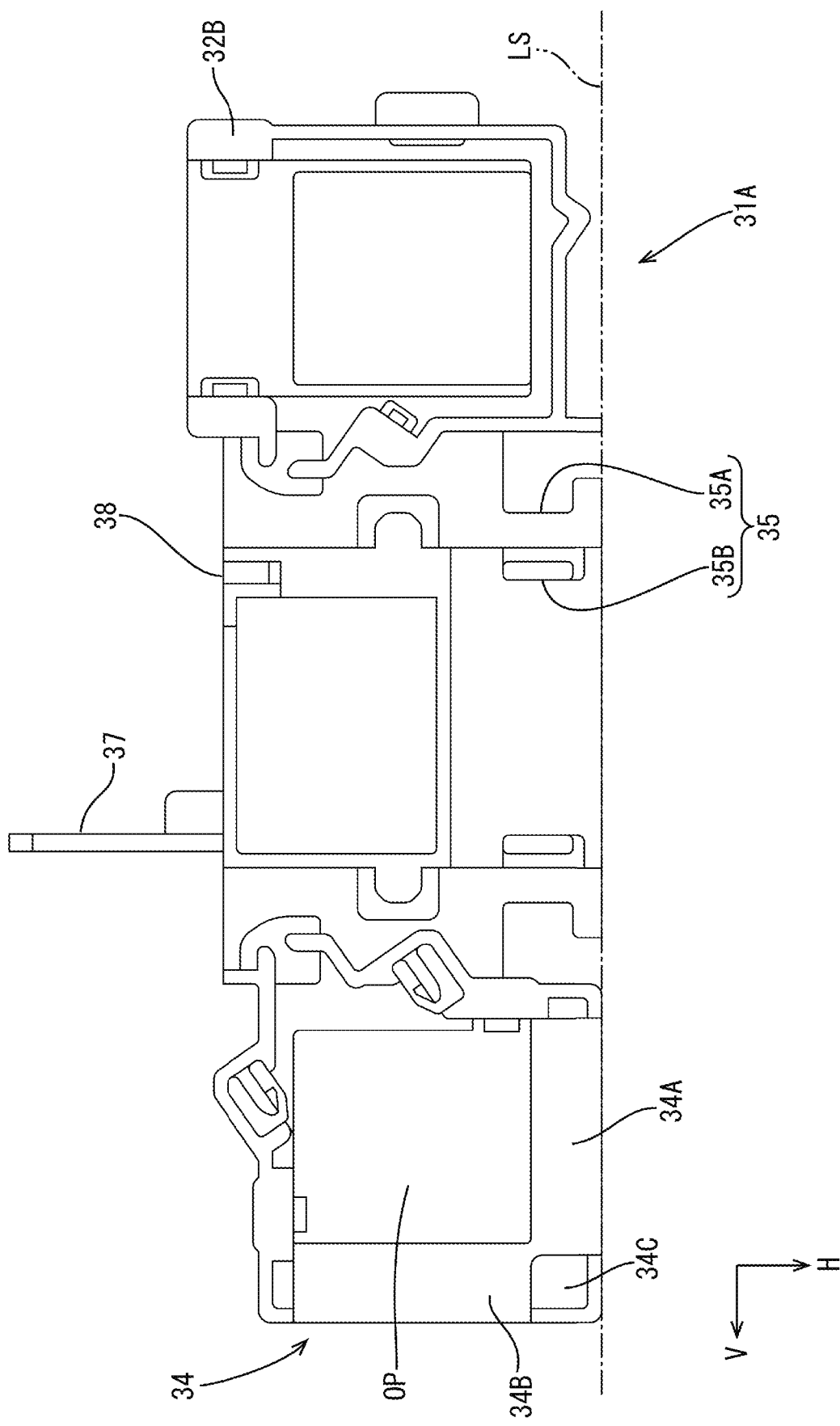
FIG. 4A is a schematic plan view of an end connection unit.

Each of the end connection units (31A, 31AR) includes a wire fixing section 35 for fixing the detection wire 52 (see FIG. 1). As illustrated in FIG. 4A, the wire fixing section 35 is disposed so as not to project outside a long side LS (illustrated with a broken line) of a rectangle in a plan view. The wire fixing section 35 is used to fix the detection wires 52 with using a banding band 53 and includes a hole 35A for fixing the banding band 53 and a hole 35B through which the banding band 53 passes. One end of the detection wires 52 that are banded with the banding band 53 is connected to the connector 55 (see FIG. 1). The connector 55 is connected to a control circuit that monitors the power storage elements 11.

Each of the end connection units (31A, 31AR) includes an external connection part 34 that can connect one of the electrode terminals 12A, 12B to an external device in multiple directions. The multiple directions include two directions of an arrow H direction and an arrow V direction illustrated in FIG. 4A (an arrow X direction and an arrow Y direction illustrated in FIG. 2).

Figure 4B:
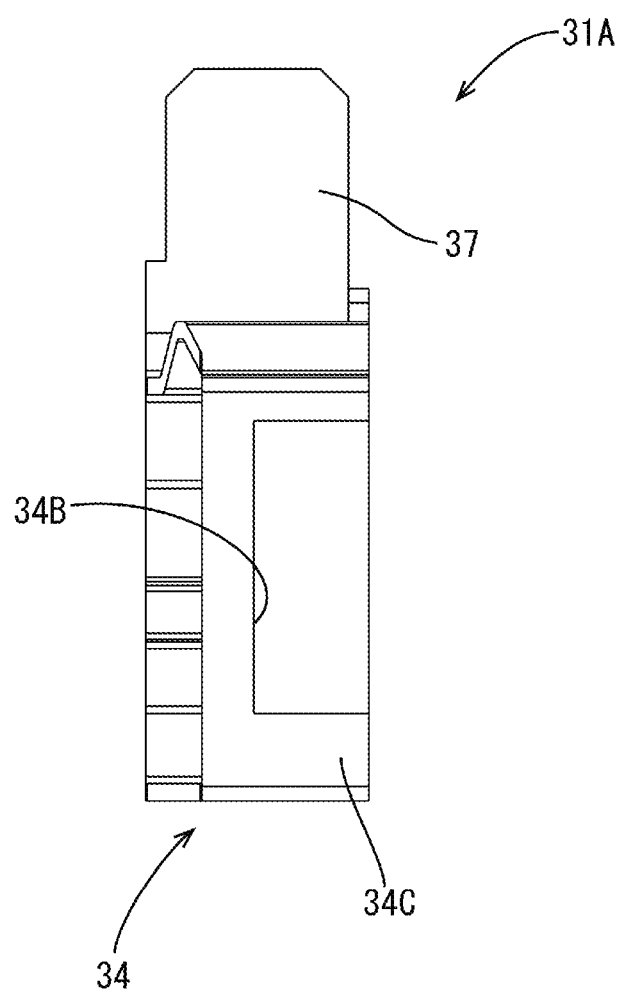
FIG. 4B is a schematic left side view of the end connection unit.

As illustrated in FIGS. 4A-4C, the external connection part 34 includes two low frame sections 34A, 34B that form the opening hole OP, and a post section 34C that is present between the low frame sections 34A, 34B. An external connection bus bar 45 can extend in the arrow H direction via the low frame section 34A and the external connection bus bar 45 can extend in the arrow V direction via the low frame section 34B (refer the broken lines in FIG. 2).

In the external connection part 34, the external connection bus bar 45 is electrically connected to the electrode terminal 12 with the bolt (not illustrated) that connects one electrode terminal 12 and the voltage detection terminal 50, for example. Thus, the power storage module 1 can be connected to other power storage module.

3. Method of assembling Power Storage Module

In assembling the connection module 20 of the above-described embodiment, the five connection units 31A-31AR illustrated in FIG. 3 are connected to each other to form the insulation protector 30. Specifically, the fitting projection 37 of each connection unit 31 is inserted in the fitting recess 38 of the adjacent connection unit 31 and pushed into a certain position.

After the connection unit 31 is obtained, the bus bar 40 is arranged in the bus bar holder 32 of the insulation protector 30. Then, the voltage detection terminal 50 to which the detection wire 52 is connected is arranged in a predetermined position within the bus bar holder 32, such as the terminal stopper 39, and placed on the bus bar 40. The detection wires 52 extended from the connection units 31 are banded with the banding band 53 and fixed with the wire fixing section 35.

The connection module 20 according to this embodiment, which is thus obtained, is mounted on the upper surface side of the power storage element group 10 while the hole-shaped electrode terminals 12 facing upward. Namely, the connection module 20 is placed above the power storage element group 10 and a bolt for connection (not illustrated) is inserted through the insertion hole 51 of the voltage detection terminal 50 and the terminal through hole 41 of the bus bar 40 so that the adjacent positive and negative electrode terminals 12A, 12B, and the electrode terminal 12 and the voltage detection terminal 50 are electrically connected. A power source terminal (not illustrated) is mounted on the external connection part 34 of each end connection unit (31A, 31AR). Thus, the power storage module 1 is completed.

4. Advantageous Effects of this Embodiment

Each of the two end connection units (31A, 31AR) is a connection unit having the same structure. One end connection unit and another end connection unit are connected to the respective corresponding intermediate connection units 31B while one end connection unit being relatively rotated by about 180 degrees with respect to another end connection unit. Namely, the end connection units (31A, 31AR) are connection units of a same type. Accordingly, the number of types of the connection units 31 can be reduced in a configuration that the insulation protector 30 is obtained by connecting the multiple connection units 31.

The wire fixing section 35 is disposed so as not to project outside the long side LS of the rectangle of end connection unit (31A, 31AR) in a plan view. Therefore, when the end connection unit 31A is rotated by 180 degrees and connected to the intermediate connection unit 31C, the wire fixing section 35 does not project outside the connection module 20 in the plan view. Therefore, a space for the connection module 20 can be reduced and a space of the power storage module 1 can be reduced.

The end connection unit (31A, 31AR) includes the external connection part 34 that can connect one of the electrode terminals (12A, 12B) to an external device in two directions that are perpendicular to each other (the arrow X direction and the arrow Y direction in FIG. 2: one example of multiple directions). Thus, the power storage element group 10 can be connected to other power storage element group in various connection forms with the external connection part 34. In forming larger power storage element group with multiple power storage element groups, the power storage element groups can be arranged in various forms.

Each of the end connection units (31A, 31AR) and the intermediate connection units (31B, 31C), that is, each of the connection units 31 is provided for each power storage element 11. Therefore, the connection module can be structured appropriately corresponding to the number of the power storage elements included in the power storage element group 10.

In a configuration including the end connection units (31A, 31AR) and the intermediate connection units (31B, 31C) provided for respective multiple power storage elements 11, a size of the end connection unit or the intermediate connection unit (the number of power storage elements) is required to be changed corresponding to the number of the power storage elements 11 included in the power storage element group 10.

For example, the number of the power storage elements 11 included in the power storage element group 10 is five, each end connection unit is provided for two power storage elements 11 and the intermediate connection unit is provided for one power storage element 11. In such a configuration, to deal with the power storage element group 10 including seven power storage elements 11, it is necessary to change the design of the intermediate connection unit to correspond to three power storage elements 11.

In the above configuration, if each connection unit 31 is provided for each power storage element 11 like this embodiment, the size of the end connection unit and the size of the intermediate connection unit are not required to be changed and the number of the intermediate connection units that are connected to each other may be changed from three to five corresponding to the number of power storage elements.

The intermediate connection units (31B, 31C) includes a first intermediate connection unit 31B that can be connected to the end connection unit (31A, 31AR) and a second intermediate connection unit 31C that can be connected to the first intermediate connection unit 31B. Therefore, a connection module corresponding to various power storage element groups 10 including the power storage elements different in number can be configured with two types of intermediate connection units of the first intermediate connection unit 31B and the second intermediate connection unit 31C.

For example, to obtain the connection module corresponding to the power storage element group 10 including nine power storage elements 11, the insulation protector is formed by connecting the end connection unit 31A, the first intermediate connection unit 31B, the second intermediate connection unit 31C, the first intermediate connection unit 31B, the second intermediate connection unit 31C, the first intermediate connection unit 31B, the second intermediate connection unit 31C, the first intermediate connection unit 31B, and the end connection unit 31AR in this sequence.

To obtain the connection module corresponding to the power storage element group 10 including eight power storage elements 11, an insulation protector is obtained by connecting the end connection unit 31A, the first intermediate connection unit 31B, and the end connection unit 31AR in this sequence, and a connection module including such an insulation protector is connected to the connection module 20 of this embodiment with the certain external connection bus bar 45. Namely, according to this embodiment, connection modules corresponding to various power storage element groups 10 including the power storage elements different in number can be obtained with only three types of connection units (31A, 31B, 31C) and without changing design of the connection units 31.

<Other Embodiments>

The present technology described in this specification is not limited to the embodiment, which has been described using the foregoing descriptions and the drawings. For example, embodiments described below are also included in the technical scope of the present technology described in this specification.

(1) In the above embodiment, the connection unit 31 is provided for each power storage element 11. However, it is not limited thereto, and the end connection unit may be provided corresponding to two power storage elements 11. Namely, in FIG. 3, the end connection unit may be obtained by combining the end connection unit 31A and the first intermediate connection unit 31B. In such a configuration, the insulation protector 30 may be obtained with the combined end connection unit, the second intermediate connection unit 31C, and the combined end connection unit that is rotated by 180 degrees. With this configuration, compared to the configuration without including the combined end connection unit that is rotated by 180 degrees, the number of types of connection units can be decreased.

(2) In the above embodiment, the wire fixing section 35 is disposed so as not to project outside the long side LS of the rectangle of the end connection unit (31A, 31AR) in a plan view. However, it is not limited thereto, and the wire fixing section 35 may be disposed to project from the long side LS of the rectangle according to a specific planar outline of the connection unit 31.

(3) In the above embodiment, the end connection unit (31A, 31AR) includes the external connection part 34 that can connect one of the electrode terminals (12A, 12B) to an external device in two directions (multiple directions) that are perpendicular to each other. However, it is not limited thereto, and the external connection part 34 may be configured to connect one of the electrode terminals (12A, 12B) to an external device in only one direction (the arrow H direction or the arrow V direction in FIG. 4A).

(4) In the above embodiment, the intermediate connection units include two types of intermediate connection units such as the first intermediate connection unit 31B and the second intermediate connection unit 31C. However, it is not limited thereto, and the intermediate connection units may include one type of intermediate connection unit or three or more types of intermediate connection units.

EXPLANATION OF SYMBOLS

10: power storage element group
11: power storage element
12A: positive electrode terminal
12B: negative electrode terminal
20: connection module
30: insulation protector
31: connection unit
31A, 31AR: end connection unit
31B: first intermediate connection unit (intermediate connection unit)
31C: second intermediate connection unit (intermediate connection unit)
32: bus bar holder
32A: first bus bar holder (bus bar holder)
32B: second bus bar holder (bus bar holder)
34: external connection part
35: wire fixing section
40: bus bar
50: voltage detection termianl (conductive member)
52: detection wire The above connection module may further include a conductive member that is held by the insulation protector and electrically connected to the power storage element, and a detection wire connected to the conductive member and detecting a state of the power storage element. The end connection unit may have a rectangular shape in a plan view and include a wire fixing section fixing the detection wire, and the wire fixing section may be arranged so as not to project outside a long side of the rectangular shape in the plan view.

According to this configuration, when the end connection unit is rotated by 180 degrees and connected to the intermediate connection unit, the wire fixing section does not project outside the connection module in the plan view. Therefore, a space for the connection module can be reduced.

In the above connection module, the end connection unit may have an external connection part that can connect one of the electrode terminals to an external device in multiple directions.

According to this configuration, the power storage element group can be connected to other power storage element group in various connection forms with the external connection part that is connectable in multiple directions. In forming larger power storage element group with multiple power storage element groups, the power storage element groups can be arranged in various forms.

In the above connection module, the end connection units and the intermediate connection unit may be disposed corresponding to each of the power storage elements.

According to this configuration, the connection module can be structured appropriately corresponding to the number of the power storage elements included in the power storage element group. In a configuration including the end connection units and the intermediate connection unit provided for respective multiple power storage elements, a size of the end connection unit or the intermediate connection unit (the number of power storage elements) is required to be changed corresponding to the number of the power storage elements included in the power storage element group.

In the above configuration, if each of the end connection unit and the intermediate connection unit is provided for each power storage element, the size of the end connection unit and the size of the intermediate connection unit are not required to be changed and the number of the intermediate connection units that are connected to each other may be changed corresponding to the number of power storage elements.

In the above connection module, the intermediate connection unit may include a first intermediate connection unit that is connectable to the end connection unit and a second intermediate connection unit that is connectable to the first intermediate connection unit.

According to this configuration, a connection module corresponding to various power storage element groups including the power storage elements different in number can be configured with two types of intermediate connection units of the first intermediate connection unit and the second intermediate connection unit.

The invention claimed is:

1. A connection module that is to be mounted on a power storage element group including power storage elements having positive and negative electrode terminals, the connection module comprising:
   a bus bar connecting the electrode terminals of adjacent power storage elements; and
   an insulation protector including a bus bar holder holding the bus bar and including connection units that are connected to each other in an arrangement direction in which the power storage elements are arranged, wherein
   the connection units include two end connection units at two ends of the insulation protector, and an intermediate connection unit being between the two end connection units,
   the two end connection units are connection units having a same structure, and
   one of the end connection units is relatively rotated by 180 degrees in a plan view with respect to another one of the end connection units, each of the end connection units is connected to a corresponding intermediate connection unit.

2. The connection module according to claim 1, further comprising:
a conductive member that is held by the insulation protector and electrically connected to the power storage element; and
a detection wire connected to the conductive member and detecting a state of the power storage element, wherein
the end connection unit has a rectangular shape in a plan view and includes a wire fixing section fixing the detection wire, and
the wire fixing section is arranged so as not to project outside a long side of the rectangular shape in the plan view.

3. The connection module according claim 1, wherein
the end connection unit has an external connection part that can connect one of the electrode terminals to an external device in multiple directions.

4. The connection module according to claim 1, wherein
the end connection units and the intermediate connection unit are disposed corresponding to each of the power storage elements.

5. The connection module according to claim 4, wherein
the intermediate connection unit includes a first intermediate connection unit that is connectable to the end connection unit and a second intermediate connection unit that is connectable to the first intermediate connection unit.

* * * * *